Patented Feb. 28, 1933

1,899,808

UNITED STATES PATENT OFFICE

LUDWIG KERN, OF WEBSTER GROVES, MISSOURI

PROCESS OF COKING CARBONIZABLE MATERIAL

No Drawing.     Application filed February 23, 1929. Serial No. 342,315.

This invention relates to the coking of carbonaceous or bituminous materials.

The procedure of forming crushed or pulverized carbonaceous or bituminous material into briquettes or shaped objects, subjecting said objects to heat in a retort and recovering the volatile constituents evolved from the carbonaceous or bituminous material by the action of the heat, is an old and well known process.

I have discovered that if the carbonaceous or bituminous material used in processes of the general class mentioned is subjected to treatment with a chemical agent of a type hereafter set forth, prior to the operation of heating said material to drive off the volatile constituents of the same, that the following highly desirable results are attained:

(1) An increase in the yield and an improvement in the character or quality of the volatile constituents liberated from the carbonaceous or bituminous material in the carbonizing or distilling operation;

(2) An improvement in the character or quality of the residue of the carbonizing or distilling operation;

(3) A simple and inexpensive procedure is had for converting the finely divided carbonaceous or bituminous material into lumps or shaped objects;

(4) From bituminous materials having a high sulfur content, a good grade of coke that is easily ignitible and which will burn freely without giving off an objectionable quantity of sulfur is obtained; and (5) The liberation of the volatile constituents of the carbonaceous or bituminous materials is achieved at a lower temperature than heretofore possible, with resulting high yields of valuable liquid hydrocarbons of unusual character.

My process, briefly described, comprises the following procedure:

(1) Crushing or pulverizing carbonaceous or bituminous material so as to effect as far as possible the mechanical separation of the carbon particles of the material from the ash-forming constituents or mineral matter of the material;

(2) Subjecting said pulverized material to treatment with a chemical agent that will act upon or react with the ash-forming constituents in such a way as to convert the material into a paste-like or plastic mass that will form into lumps or which can be formed into shaped objects, without the use of a binder; that will cause carbon dioxide to be released from the ash-forming constituents and thrown off into the air; that will cause sulfur in the said material to be eliminated in the form of a volatile compound and which will cause the ash-forming constituents to act as a contact mass or catalyst in the subsequent carbonizing or distilling operation;

(3) Forming the plastic treated carbonaceous or bituminous material into lumps, briquettes or other shaped objects of any desired form, and (4) Subjecting said lumps or shaped objects to heat for the purpose of driving off and recovering the volatile constituents of the carbonaceous or bituminous material.

By distillable carbonaceous or bituminous materials herein, I mean to include such non-gaseous natural or artificial organic carbon mixtures or compounds wherefrom volatiles can be separated by heat treating processes. As examples of such materials, the following substances are capable of treatment according to my process: coal of all kinds, peat, lignite, and like substances.

The chemical agent referred to is preferably capable of reacting or combining with the mechanically detached ash-forming constituents of the carbonaceous or bituminous materials to plasticize said ash-forming constituents and accomplish incidental results described more particularly hereinafter. In general, the chemical agent may be referred to as a plasticizing agent, inasmuch as its important function is to form with the detached, comminuted ash-forming constituents, a plastic or cementitious binder material. For example, I may use acids, such as hydrochloric acid, acid salts, acid sludges, chlorides, oxy-chlorides, hypo-chlorides, and, with water, active gases such as chlorine, and, with certain types of carbonaceous materials wherein the ash-forming constituents are suitable, bases, salts, or salts dissolved in acids or bases. For lack of a more suitable term, I will refer to such agents as plasticizing agents hereinafter.

In general, the ash-forming constituents comprise substances such as alumina, silicates, iron salts and oxides, salts of alkaline earths, and sulfur compounds and the like. These are reacted upon by the plasticizing agent in such a way that they are wholly or partially decomposed to a plastic mass. Inasmuch as this plastic mass is thoroughly disseminated throughout the carbonaceous material, it will be seen that the carbonaceous material itself will be held in the form of a plastic mass, which can be formed into shapes or briquettes, or which will naturally form into irregular lumps.

In the course of the decomposition or plasticizing of the carbonate parts of the ash-forming constituents by the plasticizing agent, carbon dioxide is evolved. The evolution of carbon dioxide during the plasticizing operation effectively eliminates any possibility of contamination of valuable gaseous volatile constituents evolved from the carbonaceous material in the subsequent distillation step. The plasticizing agent also preferably reacts with any sulfur present in the mass, and releases said sulfur as a gas, such as hydrogen sulfide, sulfur dioxide or the like, and thereby removes said sulfur from the material.

Furthermore, the salts formed by the interaction of the plasticizing agent with the ash-forming constituents are such as will later catalyze the distillation or carbonization procedure and permit the recovery of a large range of new and valuable condensible constituents.

The quantity and concentration of the plasticizing agent to be used depends upon the relative amount of ash-forming constituents present in the original carbonaceous material.

The manner of intermixing the comminuted carbonaceous material including the detached ash-forming constituents, and the plasticizing agent is immaterial. I have found, for example, a wet pan mixing apparatus or a pug mill to be suitable.

The plasticized mass of carbonaceous material may be formed into shaped objects or briquettes, according to the desirability of having regularly shaped products. The briquettes of plastic mass are then subjected to distillation, preferably in two stages; the first being but a drying stage in which mechanically included water and the like in the briquette is vaporized at temperatures not greatly exceeding 100° C., and the second being the carbonization or destructive distillation, wherein volatile parts of the carbonaceous or bituminous materials are driven off, and a coke remains. The temperature of this second stage is determined by the characteristics of the carbonaceous or bituminous material and other factors such as the composition of the ash-forming constituents, incident to the particular mixture, and cannot be generally stated. As described hereinbefore, this distillation is facilitated by the presence of catalysts formed by the action of the plasticizing agent on the ash-forming constituents of the carbonaceous or bituminous material. The condensed distillation vapors include greatly increased yields of valuable hydrocarbons and their derivatives, such as cresols, phenols, xylols and the like. In addition, the condensate will be found to contain amounts of the original plasticizing agent employed, such as chlorides, and chemical compounds formed with the distillation, including volatile salts of the ash-forming constituents, and hydrocarbon compounds such as chlorophenol and the like. Certain of these condensed products may readily be used as plasticizing agents for further amounts of undistilled material.

The residual coke has a structural or skeletal binder of hardened ash-forming constituents, and, because of said structural binder, is hard and firm, and strong enough to withstand usual shocks. It has a peculiar advantage of burning substantially without smoke, inasmuch as no smoke-producing binder material has been added at any stage of the process. Part of the ash-forming constituents has been removed, through the chemical reaction with the plasticizing agent and subsequent volatilization, as described. Sulfur has been substantially removed. As a result of such removal of part of the ash-forming constituents, it will be seen that the coke product contains substantially no greater relative amount of ash than the original coal. It is to be understood, however, that enough ash-forming constituents remain in the coke to form the skeletal binder mentioned hereinbefore.

One specific example of my process is as follows:

Bituminous Illinois coal is crushed or ground, preferably to such an extent that the particles of same will pass through a screen of 150 to 200 mesh per square inch, and the crushed coal is then conveyed to a suitable mixing device, preferably a wet pan, wherein it is treated with a dilute solution of hydrochloric acid of 1.035 specific gravity, the acid being sprayed onto the coal and mixed with same in approximately the proportions of 20% by weight of acid to 80% by weight of finely divided coal. By the action of the acid on the carbonates of the ash-forming constituents of the coal, carbon dioxide is liberated and thrown off into the air and the coal is converted into a paste-like or plastic mass. The acid also reacts with certain constituents of the coal causing sulfur to be released in the form of volatile or gaseous sulfur compounds during the later carbonizing or distilling operation. The acid causes the carbonates and oxides of the metals, and alkalis and alkali earths present in the coal to be converted into their corresponding chlorides, oxy-chlorides and the like.

The operation of mixing the hydrochloric acid with the finely divided coal is continued until the coal has become a plastic mass, which plastic mass is thereafter formed into lumps or briquettes or shaped objects. These briquettes are subjected to a drying operation, usually at a temperature of the order of 100° C., after which said briquettes are removed to a carbonizing or distilling apparatus and heated to the desired temperature. Due to the manner in which the hydrochloric acid has been combined with the finely divided coal, the raw materials of the reaction are in such intimate contact with each other that they will effectively react with each other under the influence of the gradually rising temperature to which the briquettes are subjected in the carbonizing or distilling treatment.

From the foregoing it will be seen that in the process above described it is not necessary to use binders, such as tar, pitch, molasses, etc., or employ complicated procedure in the operation of converting the ground or pulverized carbonaceous or bituminous material into such a state or condition that it can be handled in a retort, due to the fact that the agent used to treat said finely divided material to eliminate carbon dioxide and sulfur and convert the mineral matter of said material into a highly efficient catalyst or contact mass, also converts the carbonaceous or bituminous material into a paste-like or plastic mass that can be easily briquetted, or which, after drying, can be broken into lumps. Said process enables coal of a high sulfur content to be converted by a distilling operation into coke of excellent structure, that will burn freely without giving off objectionable quantities of sulfur. Said process also makes possible the recovery of relatively greater quantities of valuable liquid hydrocarbons of unusual character from non-coking coals or other carbonaceous materials which heretofore were considered unfit or unsuitable for the production of coke on account of their lack of coking constituents.

In view of the above it will be seen that the several objects of the invention are achieved and other advantageous results obtained.

As many changes could be made in carrying out the above processes without departing from the scope of the invention, it is intended that all matter contained in the above descriptions shall be interpreted as illustrative and not in a limiting sense.

Having thus described my invention, what I claim as new and desire to secure by Letters Patent of the United States is:

1. The process of coking solid carbonizable material, which comprises pulverizing said material, treating the pulverized material with a plasticizing agent adapted to react with at least part of said material to convert said material into a plastic mass, and to evolve carbon dioxide and volatile sulfur compounds, forming said plastic mass into briquettes, and subjecting said briquettes to a destructive distillation, and thereby forming coke.

2. The process of coking solid carbonizable material, which comprises pulverizing said material, treating the pulverized material with a chloride adapted to form with said material a plastic mass, forming said plastic mass into briquettes, and subjecting said briquettes to a destructive distillation, and thereby forming coke.

3. The process of coking coal, which comprises pulverizing said coal to the extent that substantially all of the particles will pass through a screen of about 150 mesh per inch, forming said pulverized coal into a plastic mass by treating with aqueous hydrochloric acid, and forming carbon dioxide and volatile sulfur compounds by the reaction of said hydrochloric acid with the ash-forming constituents of said coal, forming the plastic mass into briquettes, subjecting said briquettes to a drying operation at the temperature of the order of 100 degrees C., whereby mechanically held water is expelled, and further subjecting said briquettes to a destructive distillation whereby the volatile hydrocarbonaceous constituents of said coal are vaporized, and thereby forming coke.

4. The process of coking solid carbonizable material, which comprises comminuting said material to an extent sufficient to mechanically detach ash-forming constituents of said material, adding a plasticizing agent to said comminuted material, said plasticizing agent reacting with the detached ash-forming constituents to form a binder for the remainder of the distillable material and thereby to plasticize the entire mass of comminuted material, and subjecting the plastic mass to a destructive distillation, and thereby forming coke.

5. The process of coking solid distillable carbonaceous material, which comprises comminuting said material to an extent sufficient to mechanically detach ash-forming constituents of said material, adding thereto a plasticizing agent capable of reacting with said ash-forming constituents to plasticize the entire mass of comminuted material, said plasticizing agent also reacting with said ash-forming constituents to release therefrom sulfur in a gaseous condition, and subjecting the plastic mass to a destructive distillation, and thereby forming coke.

6. The process of coking coal, which comprises comminuting said coal to an extent sufficient to mechanically detach ash-forming constituents of said coal, adding hydrochloric acid to said detached ash-forming constituents to form a binder for the remainder of the coal and thereby to plasticize the entire mass of coal, and subjecting the plastic mass to a destructive distillation, and thereby forming coke.

7. The process of coking coal, which comprises comminuting said coal to an extent sufficient to mechanically detach ash-forming constituents of said coal, adding hydrochloric acid to said detached ash-forming constituents to form a binder for the remainder of the coal and thereby to plasticize the entire mass of coal, and subjecting the plastic mass to a destructive distillation, said hydrochloric acid also reacting with said ash-forming constituents to release sulfur therefrom, and thereby forming coke.

LUDWIG KERN.